(12) United States Patent
Grzych et al.

(10) Patent No.: US 7,228,235 B2
(45) Date of Patent: Jun. 5, 2007

(54) SYSTEM AND METHOD FOR ENHANCED MEASURE-CORRELATE-PREDICT FOR A WIND FARM LOCATION

(75) Inventors: Matthew L. Grzych, Snoqualmie Pass, WA (US); Dennis A. Moon, Grand Rapids, MN (US); Neil R. Lincoln, Shoreview, MN (US); Rolf D. Miller, Minneapolis, MN (US)

(73) Assignee: Windlogics, Inc., St. Paul, MN (US)

( * ) Notice: Subject to any disclaimer, the term of this patent is extended or adjusted under 35 U.S.C. 154(b) by 0 days.

(21) Appl. No.: 11/343,744

(22) Filed: Jan. 31, 2006

(65) Prior Publication Data

US 2006/0173623 A1 Aug. 3, 2006

Related U.S. Application Data

(60) Provisional application No. 60/648,889, filed on Feb. 1, 2005.

(51) Int. Cl.
*G01W 1/00* (2006.01)
(52) U.S. Cl. .......................................... 702/3
(58) Field of Classification Search .................... 702/3, 702/4, 5
See application file for complete search history.

(56) References Cited

U.S. PATENT DOCUMENTS 6,975,925 B1 12/2005 Barnes et al.
2002/0194113 A1 12/2002 Lof et al.
2003/0160457 A1 8/2003 Ragwitz et al.
2005/0108150 A1 5/2005 Pethick et al.
2005/0234762 A1 10/2005 Pinto et al.

OTHER PUBLICATIONS

Pinson et al., "Wind Power Forecasting using Fuzzy Neural Networks Enhanced with On-line Prediction Risk Assessment", 2003 IEEE Bologna Power Tech Conference, Jun. 23-26, 2003, 8 pages.*
Milligan et al., "*Statistical Wind Power Forecasting for U.S. Wind Farms*," National Renewable Energy Laboratory, Jan. 11-15, 2004, 11 pages.
Larson and Gneiting, "*Statistical Algorithms for Short-Term Wind Energy Forecasting*," 17th Conference on Probablity and Statistics in the Atmospheric Sciences, 2004, 2 pages.

(Continued)

*Primary Examiner*—Donald McElheny, Jr.
(74) *Attorney, Agent, or Firm*—Patterson, Thuente, Skaar & Christensen, P.A.

(57) ABSTRACT

Enhanced meteorological measure-correlate-predict systems and methods. The systems and methods preferably consider publicly available, long-term data sets at each of a plurality of locations nearby a potential wind farm location. A test tower is preferably located at the potential location to collect a shorter-term data set, which, in combination with the long-term data set, is used to correlate and train embodiments of the systems and methods of the present invention using computational learning systems. Longer-term data can then be predicted for the potential wind farm location based on the correlation.

42 Claims, 9 Drawing Sheets

OTHER PUBLICATIONS

Gregor Giebal, "*The State-of-the-Art in Short-Term Prediction of Wind Power*," Project ANEMOS, Aug. 12, 2003, 36 pages.

Li et al., "*Comparative Analysis of Regression and Artificial Neural Network Models for Wind Turbine Power Curve Estimation*," Journal of Solar Energy Engineering, Copyright 2001, 6 pages.

Murto, "*Neural Network Models for Short-Term Load Forecasting*," Helsinki University of Technology, Jan. 5, 1998, 92 pages.

Li et al., "*Using Neural Networks to Estimate Wind Turbine Power Generation*," IEEE Transactions on Energy Conversion, vol. 16, No. 3, Sep. 2001, 7 pages.

Damousis et al., "*A Fuzzy Model for Wind Speed Prediction and Power Generation in Wind Parks Using Spatial Correlation*," IEEE Transactions on Energy Conversion, vol. 19, Issue 2, Jun. 2004, 10 pages.

\* cited by examiner (a)

(b)

SYSTEM AND METHOD FOR ENHANCED MEASURE-CORRELATE-PREDICT FOR A WIND FARM LOCATION

RELATED APPLICATION

The present application claims priority to U.S. Provisional Patent Application Ser. No. 60/648,889, filed Feb. 1, 2005, and entitled "SYSTEM AND METHOD FOR ENHANCED MEASURE-CORRELATE-PREDICT," which is incorporated herein by reference in its entirety.

FIELD OF THE INVENTION

The present invention relates generally to meteorology and more particularly to long-term estimation of wind speeds and wind energy production for a wind farm location.

BACKGROUND OF THE INVENTION

Wind turbine farms have become increasingly popular as sources of renewable energy. Because the capital costs associated with establishing and operating a wind farm can be high, careful planning is needed to select an optimal location. Flat open spaces or elevated areas such as ridges might initially seem to be good potential wind farm sites, but localized atmospheric conditions and uneven wind patterns can reduce the output and therefore the viability of particular sites.

Developers therefore typically evaluate potential sites by studying wind patterns and other meteorological conditions over time. A single test turbine or tower is often set up on a site and measurements are collected over a relatively short time period, for example for one to several years. The measurements can then be analyzed to determine the viability of the site for a permanent wind farm. Meteorological measurements at nearby locations, such as airports, weather service, or other collection points, are typically publicly available and have usually been collected for decades or more, and therefore may also be analyzed with respect to potential wind farm sites.

The analysis of meteorological measurements collected on-site by a test tower or nearby from an airport or other collector, can be carried out in a multitude of ways. On-site test tower data is usually most accurate but is only available for the test period, which is relatively short and may not capture longer term meteorological trends at the test site. For example, a developer of a wind project may have collected one or a few years of wind speed and wind direction measurements on a property. Because wind characteristics can change considerably from one year to the next, and may have multiyear or decadal patterns that cannot be captured in a relatively short period of on-site measurement, it is important to find a way to estimate the longer-term wind characteristics over decades of time. If only nearby data and not on-site test data is available, a developer can extrapolate the data to estimate conditions at the particular proposed location. Although such methods often provide longer term data collected over several decades, extrapolating the data to another location introduces uncertainties and usually provides less accurate results.

A more common and typically more accurate analysis approach combines the two above-described data sets in a Measure-Correlate-Predict (MCP) methodology. As depicted in FIG. 1, a traditional MCP approach uses linear correlation between measurements collected at a single nearby off-site long-term wind measurement point 104 and a shorter-term on-site measurement point 102. In particular, one linear MCP approach uses data from a single long-term measurement point 104 (such as an airport anemometer measurement dataset), finds a relationship between long-term measurement point 104 and on-site measurement point 102 using a simple method such as linear correlation (the "correlate" step), and then uses this relationship to estimate on-site values for point 102 using long-term measurement point 104 for the longer time period (the time period for which only the long-term values, and not the on-site values, are available). In some cases, this may be done on a "sectorized" basis using wind direction and/or wind speed bins and determining a correlation for each bin of values, and different time averaging periods can be used for the analysis (daily, weekly or monthly average wind speeds, for example), but the process remains basically the same. One example of a wind direction bin would be to divide the 360 degrees of the compass into twelve sectors of thirty degrees each, allocate the wind data to these bins based on its direction, and then correlate each bin separately, but many variations are possible.

One example of an existing methodology is U.S. Pat. No. 6,975,925, directed to forecasting an energy output of a wind farm. Other general examples of predictive modeling include U.S. Patent Application Publication No. 2005/0234762, which is directed to dimension reduction in predictive model development, and U.S. Patent Application Publication No. 2003/0160457, directed to a method and device for processing and predicting the flow parameters of turbulent media. Some existing systems and methods particularly relate to insurance and risk evaluation, such as U.S. Patent Application Publication No. 2002/0194113, directed to a system, method, and computer program product for risk-minimization and mutual insurance relations in meteorology dependent activities, and U.S. Patent Application Publication No. 2005/0108150, directed to a method and system for creating wind index values supporting the settlement of risk transfer and derivative contracts.

These and other traditional approaches suffer from a number of drawbacks. In particular, conventional methodologies utilize only a limited data set over a limited time frame. Further, traditional MCP systems do not use more complex data sets, including multiple variable three-dimensional data collected at multiple points and locations. Therefore, traditional linear MCP systems have been acceptable but provide results constrained by the limited data sets. As interest and investment in renewable wind energy sources recently has increased, the marginality of results has become more important in the industry, requiring better, more refined models. Accordingly, a need exists for new, more robust MCP systems and methods capable of handling larger real and predictive data sets and information to provide accurate results.

SUMMARY OF THE INVENTION

The present invention substantially addresses the aforementioned needs by providing enhanced meteorological measure-correlate-predict systems and methods. The systems and methods preferably consider publicly available, long-term, three-dimensional data sets at each of a plurality of locations nearby a potential wind farm location. A test tower is preferably located at the potential location to collect a shorter-term data set used to correlate embodiments of the systems and methods of the present invention using computational learning systems. Longer-term data can then be predicted for the potential wind farm location.

In one embodiment, a method for correlating and predicting wind speed and wind energy production at a wind farm location includes assembling a first set of meteorological measurements at a test location over a short-term time period and assembling a second set of meteorological measurements at a plurality of locations over a long-term time period. The first and second sets of meteorological measurements are correlated during at least a portion of the short-term time period using at least one non-linear mathematical method to determine a non-linear pattern of relationships between subsets of each the first and second sets of meteorological measurements that accurately predicts each time-based subset of the first set of meteorological measurements from only a corresponding time-based subset of the second set of meteorological measurements. A set of meteorological conditions can then be predicted at the test location for at least a portion of the long-term time period not including the short-term time period using the second set of meteorological measurements and the detected pattern of relationships.

A computational learning system is used in one embodiment to correlate time-based subsets of each the first and second sets of meteorological measurements to detect patterns of relationships. The computational learning system may be an artificial neural network, a support vector machine, or some other "artificial intelligence" system.

Each of the plurality of locations can be selected based on at least one characteristic of each location, such as a geographic location local to the test location. Other selection characteristics include a geophysical characteristic similar to a geophysical characteristic of the test location, a meteorological characteristic similar to a meteorological characteristic of the test location, and the public availability of the second set of meteorological measurements over the long-term time period at the location.

The first set of meteorological measurements can be assembled at a test location over a time period of from about one year to about five years in one embodiment. The second set of meteorological measurements can be assembled at each of the plurality of locations over a time period of from about two years to about one hundred years in one embodiment, with the longer time period overlapping the shorter time embodiment.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood from the following detailed description of various embodiments in connection with the accompanying drawings, in which.

Figure 1:
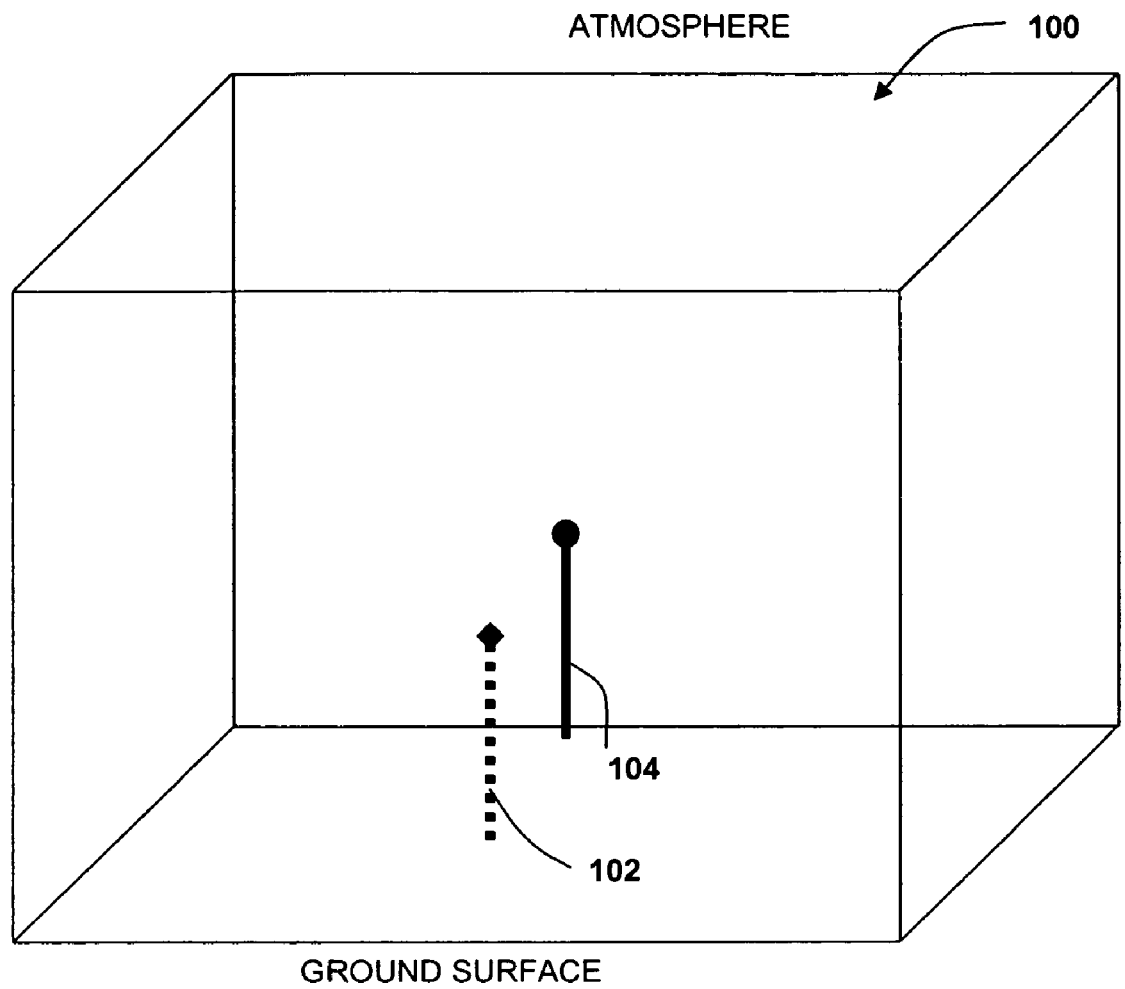
FIG. 1 is a diagram of a three-dimensional space according to a traditional MCP approach.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

The enhanced MCP systems and methods of the present invention use a computational learning system combined with simultaneous use of long-term three-dimensional data sets collected at a plurality of locations near a target location to correlate and predict wind speed and other meteorological conditions at the target location. The invention can be more readily understood by reference to FIGS. 1–13 and the following description. While the invention is not necessarily limited to the specifically depicted application(s), the invention will be better appreciated using a discussion of exemplary embodiments in specific contexts.

As discussed above, FIG. 1 depicts a potential wind turbine or farm location 102, which exists in a three-dimensional space 100. According to a previous linear MCP system, data from a single nearby site 104 is linearly correlated with data collected at site 102. Site 104 is typically selected for being geographically near to site 102 and for having a long-term data set available. Such a long-term data set may include data collected for several decades or more, while the data set collected at site 102 may comprise only one to several years of data. The long-term and short-term data may include observed on-site wind speed, wind direction, air density, air pressure, temperature and/or other weather variables. The resulting linearly correlated relationship can then be used to estimate values for site 102 using the data from nearby long-term site 104 for the longer time period. Example test results for a traditional linear MCP approach in accordance with FIG. 1 are described below with reference to FIGS. 8 and 9. The above-described traditional linear MCP approach in accordance with FIG. 1 does not take full advantage of the three-dimensionality of space 100 and data available at multiple points near to site 102 and therefore provides less than optimal results.

Figure 2:
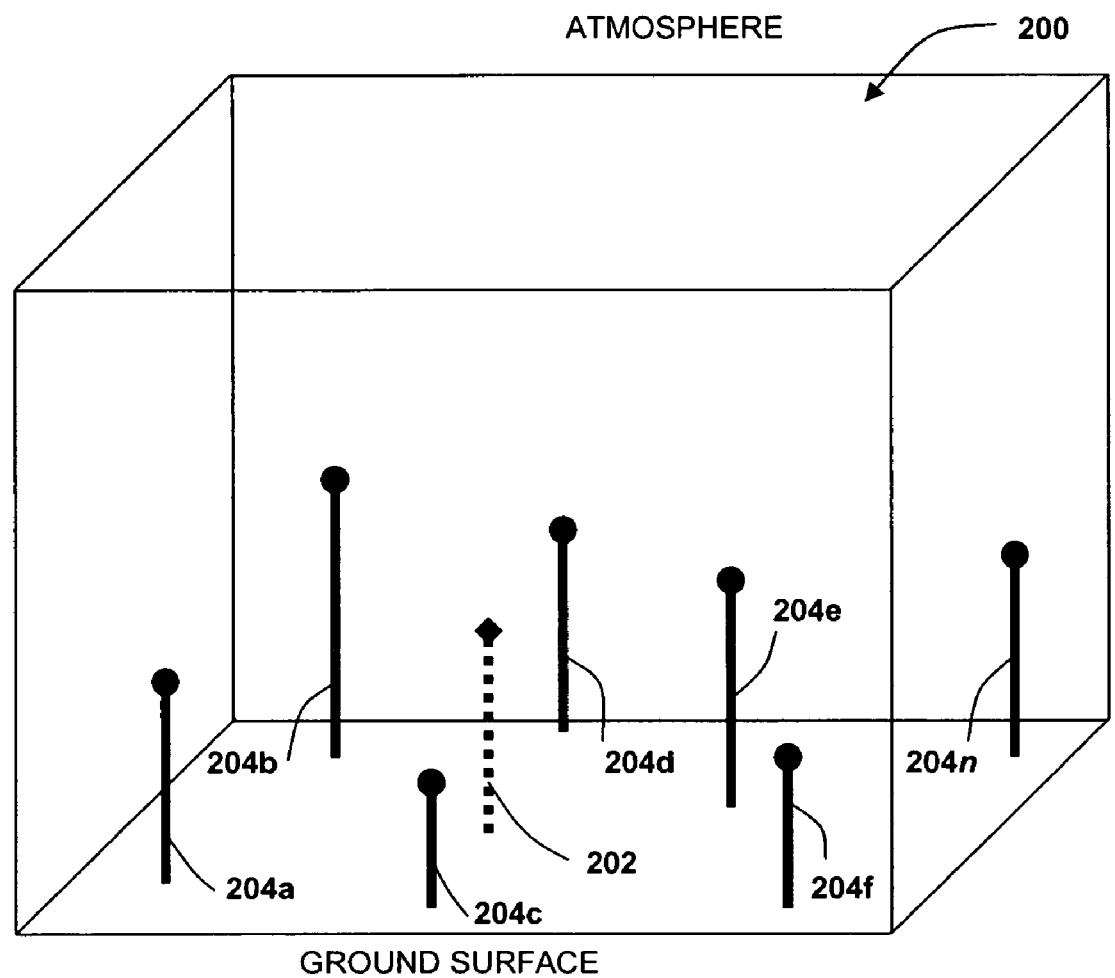
FIG. 2 is a diagram of a three-dimensional space according to one embodiment of an enhanced MCP approach of the invention.

Referring now to FIG. 2, the enhanced MCP approach of the present invention utilizes long-term three-dimensional data sets for a plurality of reference locations 204a–204n nearby a potential wind turbine or farm site 202, referred to as a site of interest. Site of interest 202 exists in a three-dimensional space 200 defined between a ground surface and some point in the atmosphere, and it can be appreciated by those skilled in the art that an infinite number of three-dimensional spaces can be defined around or including any site of interest 202. Space 200 as illustrated is therefore arbitrary and has been simplified for this example. Reference locations 204a–204n preferably are selected at least because each site 204a–204n is associated with a publicly available set of relevant long-term meteorological data. Sites 204a–204n therefore are often airports, municipal agencies, or other weather data collection sites. The particular number of reference locations 204a–204n is not significant and therefore may vary in other embodiments of the invention.

With reference to three-dimensional space 200, each site 204a–204n has its own unique characteristics and may collect data at a variety of heights relative to the ground. These weather variables may be extrapolated to the desired height above ground level, such as a height associated with a test turbine at site 202 or potential wind farm. For example, while the measurement equipment on the on-site measurement tower at site of interest 202 may be at a lower height, such as thirty meters above ground level, any measurements obtained could be extrapolated using various methods to approximate the values at a desired higher height, such as eighty meters above ground level. Some of these values may also be extrapolated from other nearby locations 204a–204n to location of interest 202, such as using certain values from a nearby airport to augment the measurements that are directly taken at site 202 for weather variables (such as air pressure or air density) that may not be available at the on-site measurement location, site of interest 202.

In general, whether measured directly or extrapolated, the data associated with each of sites 204a–204n is referred to as a set of known or "hypothesis" variables. The hypothesis variables therefore comprise a plurality of individual sets of data, each set associated with a site 204a–204n and available for a longer time period, such as from several years to several decades or more. The data associated with site of interest 202 is referred as the "target" variable(s). The target variables are available or known for a shorter time period, for example from several months to several years of a test period, but are unknown for the balance of the longer time period for which the hypothesis variables are known. The enhanced MCP system and method of the invention therefore aim to predict the target variable(s) over a longer-term time period, based upon a correlation detected between the hypothesis variables and the shorter set of known target variables.

Figure 3:
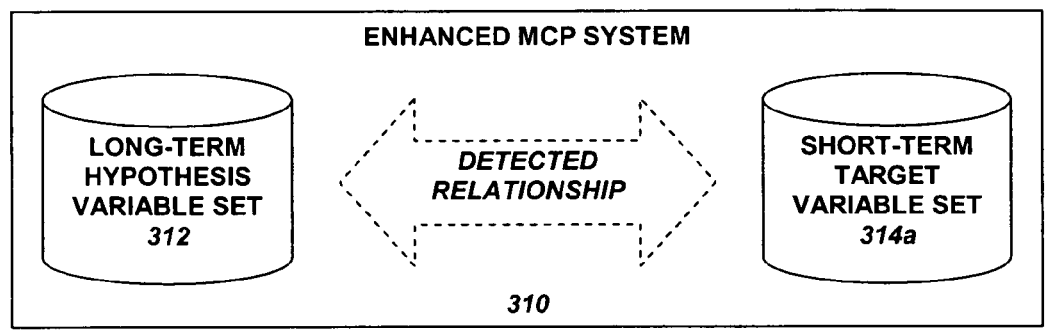
FIG. 3 is a block diagram of a system according to one embodiment of the invention.
Figure 3:
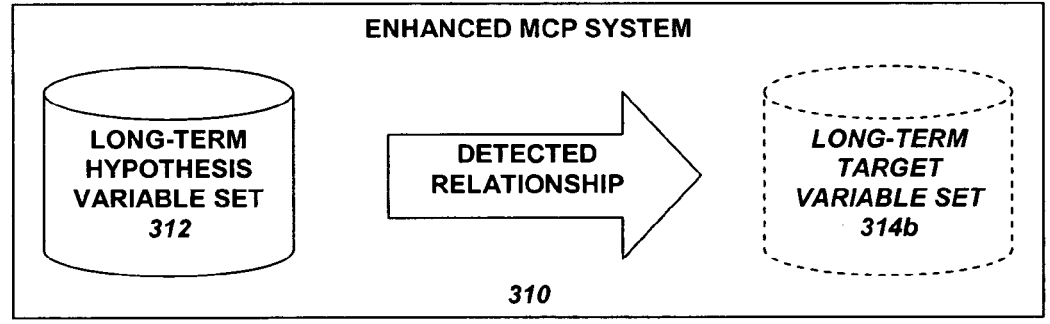

Referring to FIG. 3, an enhanced MCP system 10 implementing one or more enhanced MCP methods of the present invention utilizes a computational learning system approach involving use of a large number of cases for which there is both a set of known hypothesis variables 312 and a known target variable 314a. Computational learning systems are a type of "artificial intelligence" concerned with detection and use of the complex patterns and relationships in data. Examples of computational learning systems include, but are not limited to, artificial neural nets and Support Vector Machines. The detected patterns or relationships that result from such computational learning systems may be extremely complex and non-intuitive, and can involve complicated multi-point or multi-value non-linear relationships.

FIG. 3(a) represents a correlating process or step. Known long-term hypothesis variable set 312 and known short-term target variable set 314a are correlated to detect patterns or relationships between the data sets 312, 314a. In one embodiment, this correlation comprises utilizing non-linear mathematical methods to determine patterns of relationships between subsets of each long-term hypothesis variable set 312 and short-term target variable set 314a, yielding a non-linear formula that can be used to accurately predict each time-based subset of short-term target variable set 314a from only a corresponding time-based subset of long-term hypothesis variable set 312. This non-linear formula can then be used to predict target variable set 314b for the long-term, as depicted in FIG. 3(b).

This type of training and prediction is common to the use of artificial learning systems but has not previously been applied to wind speed and wind power, which use complex meteorological data sets collected at multiple points. For purposes of the present invention's approach, hypothesis variables 312 may come from multiple long-term off-site anemometer measurements (such as from one or more airports), but more commonly come from the Global Reanalysis dataset, the North American Reanalysis dataset, or a similar long-term, gridded representation of weather data. As an example, the National Centers for Environmental Prediction (NCEP) and National Center for Atmospheric Research (NCAR) have cooperated in the Global Reanalysis project to produce a retroactive record of atmospheric data fields (hereinafter referred to as the "Global Reanalysis data" or "Reanalysis data") in support of the needs of the research and climate monitoring communities. This effort involved the recovery of land surface, ship, rawinsonde, aircraft, satellite and other weather data; ensured strict quality control of all data; and combined all data with a data assimilation system that is kept static over the complete period. The assignee of the present invention has this massive dataset online and has developed special technology to extract values from the archive over the entire planet for use with system 10 and the methods described in more detail below. Specific hypothesis variables 312 used for training system 10 include multiple weather variables representing wind, air density, and atmospheric thermal structure information. Additional variables may be included for certain locations, and variables from multiple levels (multiple heights above ground level, multiple pressure levels in the atmosphere, etc.) may be used as members of the set of hypothesis variables 312.

The data for the variables (both hypothesis 312 and target 314 variables) may be used as instantaneous values or may be aggregated into larger averaging periods. For example, observed on-site wind data at site of interest 402 may be recorded every ten minutes, but may be aggregated into an hourly average (or a larger period average) for use in the method. Similarly, the time averaging unit for hypothesis variables 312 and target variables 314 can be varied to find the best correlation or predictive performance of the method for site of interest 202, and the method can be done using every available value from the hypothesis variable data set or by using daily, weekly, monthly, or other averaging periods.

Figure 4:
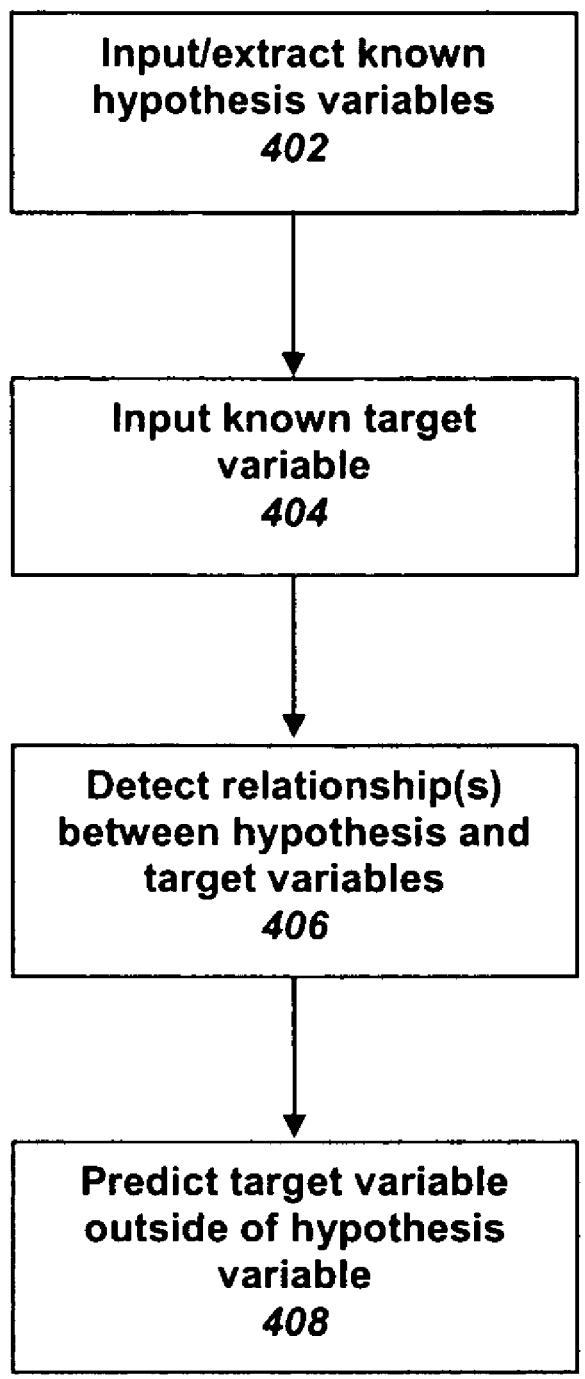
FIG. 4 is a flowchart of a method according to one embodiment of the invention.
Figure 5:
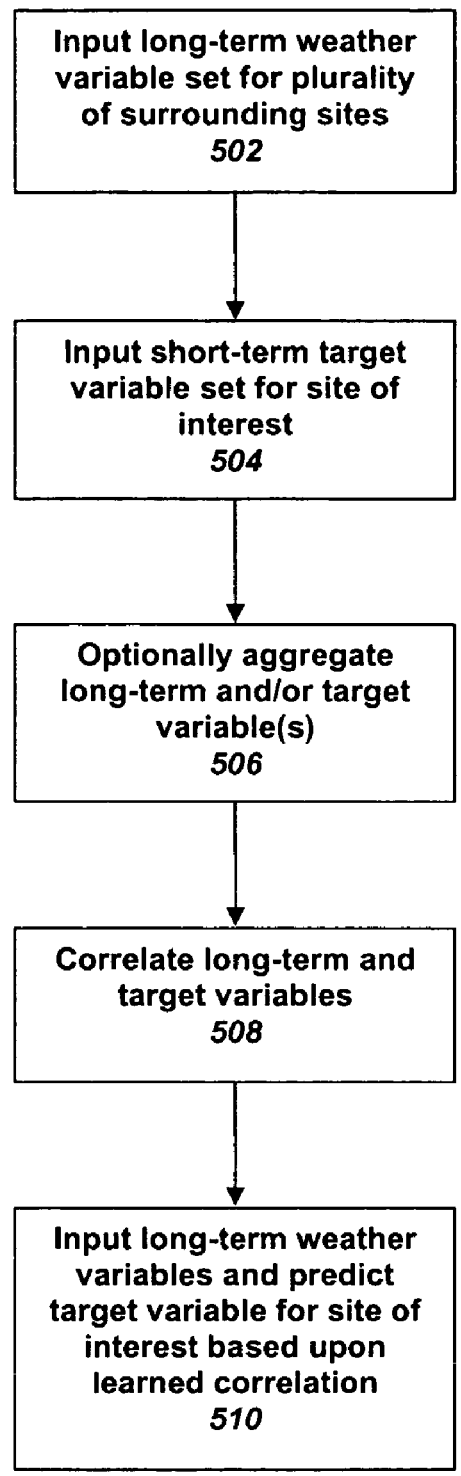
FIG. 5 is a flowchart of a method according to another embodiment of the invention.

Therefore, one embodiment of an enhanced MCP method of the present invention is depicted in the flowchart of FIG. 4, with additional reference to FIG. 2. Long-term hypothesis variable set 312 and short-term target variable set 314a are input into or extracted by system 10 at steps 402 and 404, respectively. "Extracted by" refers to an embodiment in which system 10 automatically requests or collects variable sets 312 and 314a from a spreadsheet, database, memory system, or other computer-implemented storage means. Data sets 312 and 314a are correlated to detect patterns or relationships between data sets 312 and 314a. In one embodiment, this correlation comprises utilizing non-linear mathematical methods to determine patterns of relationships between subsets of each long-term hypothesis variable set 312 and short-term target variable set 314a, yielding a non-linear formula that can be used to accurately predict each time-based subset of short-term target variable set 314a from only a corresponding time-based subset of long-term hypothesis variable set 312. At step 408, this non-linear formula can then be used to predict target variable set 314b for the long-term time period Referring to FIGS. 2 and 5 and a more particular example according to one embodiment of an enhanced MCP method of the present invention, long-term publicly available weather variables 312 for a plurality of sites 204a–204n near to a test or potential site 202 are input to or extracted by system 10 at step 502. An on-site short-term target variable set 314a is input into or extracted by system 10 at step 504, and system 10 subsequently and optionally aggregates the long-term and target variable sets 312 and 314a at step 306. Variable sets 312 and 314a are correlated at step 308, resulting in a non-linear formula that can be used at step 310 to predict a long-term target variable set 314b for site of interest 202.

For example, by using forty years of simultaneous data from multiple off-site points with the present invention, it was demonstrated that the effective correlation of wind power was improved from a coefficient of determination ($R^2$) of 0.67 for a traditional linear MCP method to an $R^2$ of 0.92 for the enhanced MCP method of the present invention. More importantly, the enhanced MCP method of the present invention reduced the average monthly power error from 23.9% to 8.4% and provided a long-term time series that properly captures the full dynamic range of the values. The monthly average power and speed errors are the most direct measurement of the ability of the enhanced MCP method of the present invention to properly form long-term estimates. The coefficient of determination is also a useful measure of the pattern match between two data sources, with higher values indicating better correlation. Generally, a value of 0.8 or greater indicates a strong correlative relationship between wind time series.

Figure 6:
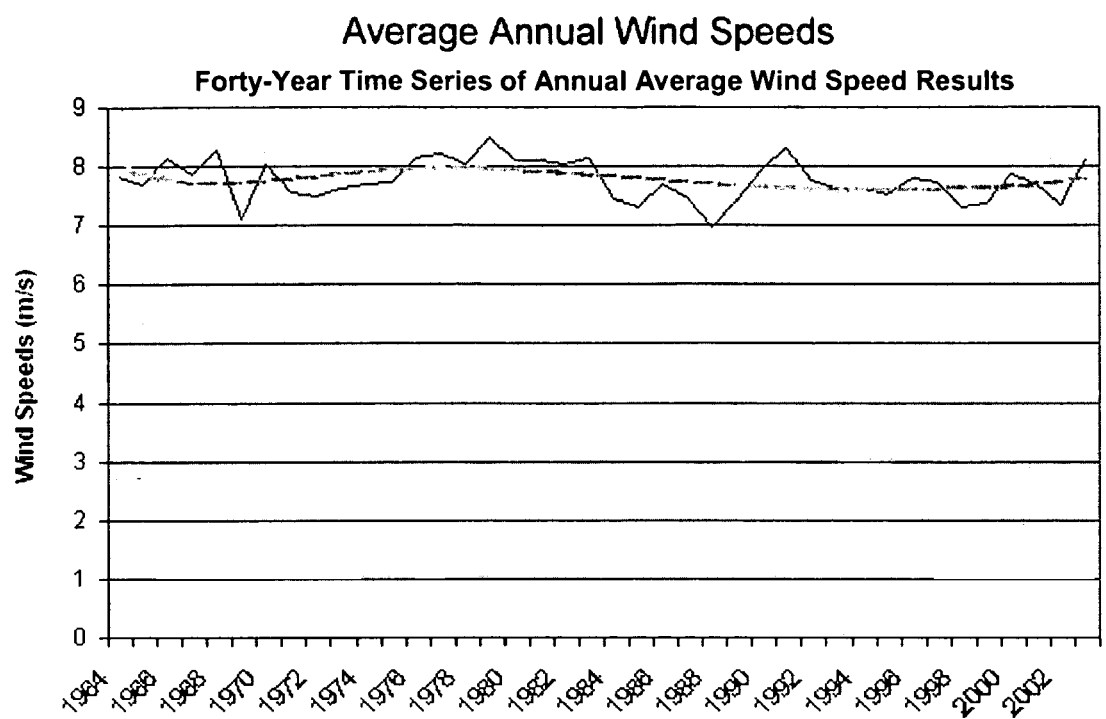
FIG. 6 is a graphic representation of a forty-year time series of annual average wind speed results.
Figure 7:
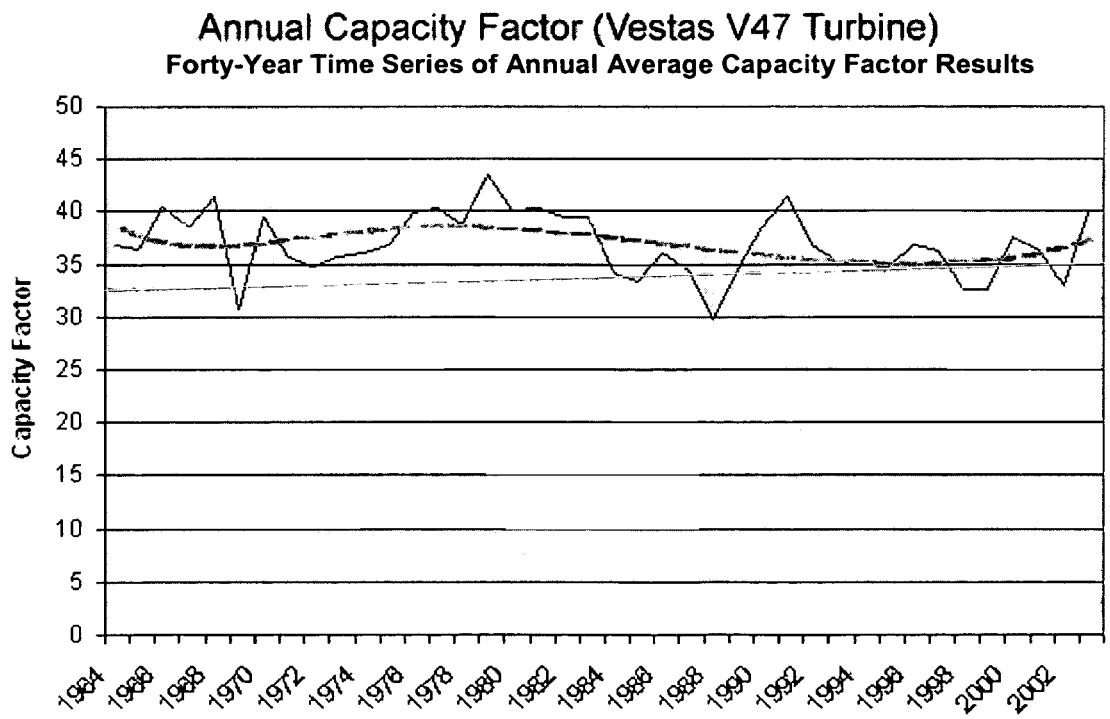
FIG. 7 is a graphic representation of a forty-year time series of annual average capacity factor results.

From the resulting values that are generated by the enhanced MCP method of the present invention, it is straightforward to calculate the average speed and gross capacity factor based on the complete forty-year data period. Examples of the forty-year sequences of annual average wind speed and capacity factor for an actual site utilizing the enhanced MCP method of the present invention are shown in FIGS. 6 and 7. The standard deviations of inter-annual variability can similarly be calculated and used to generate the predictive intervals (P75, P90, P95, P99, etc., or "probability of exceed" calculations of various types) for wind speed, power, or turbine capacity factor.

The method of the present invention may also include estimation of the error of prediction. This is done by withholding data in a month-by-month round-robin approach. Results show very strong predictive ability, much enhanced over traditional MCP methods, providing confidence that the present invention's results are a very good representation of the long-term wind and power history for site of interest 202.

Detailed Example Results

One example study used thirty-four months (October 2001–July 2004) of tower data to find the relationships between the tower-based speed, such as at site of interest 202 in FIG. 2, and power values and multiple points, such as sites 204a–204n, in the Global Reanalysis data using multiple variables at each site 204a–204n. The relationships were then applied to the other years of the Reanalysis data to generate a long-term time at site of interest 202. In other words, the system and method of the invention used the short-term on-site data and multiple sets of publicly available off-site long-term data to predict non-measured data on-site for the long-term. Some specific details regarding this particular instance of the use of the enhanced MCP method of the present invention are provided below.

The net tower data for the thirty-four-month time period was of relatively good quality: less than 25% of any month's data was flagged or questionable. Tower data was flagged if the twenty-seven meter wind speed was less than 90% of the twenty meter or ten meter speed, or if the twenty meter wind was less than 90% of ten meter speed. There were many occurrences of the twenty-seven, twenty, and ten meter winds all being exactly 0.5 meters/second concurrently. These occurrences were flagged as being suspicious data.

Ten-minute tower data was averaged at the top of each hour using the three surrounding data points and then adjusted to UTC (Coordinated Universal Time). The tower data was adjusted to an equivalent fifty meter height using the measured shear coefficient between the twenty meter and twenty-seven meter tower levels. The shear between twenty-seven meter and fifty meter would typically be smaller than the shear between twenty meter and twenty-seven, and was assumed to be 70% of the twenty meter—twenty-seven meter shear for extrapolation purposes. In situations in which the twenty meter and twenty-seven meter levels indicated negative shear, the twenty-seven meter—fifty meter shear was set to zero.

The wind speeds were converted to power using a Vestas V47 power curve, a power curve associated with a particular wind turbine of this example. Other power curves can also be used as appropriate in other embodiments of the invention, as understood by those skilled in the art. The correlation process, and the power graphs illustrating the correlation process, assume standard density. However, the hour-by-hour variations in air density were considered when creating the long-term power time series on which the site statistics are based. All final data and statistics are based on the varying speed and air density values for site of interest 202.

The goodness of fit for the correlation was evaluated primarily on the basis of the ability of the enhanced MCP method of the invention to create a time series of monthly energy production (monthly average power), from Reanalysis data only, that matched the power time series based on the tower wind speed data. The method therefore correlated the Reanalysis data and the measured tower data until relationships were detected that generated power time series that matched the actual measured tower wind speed data. Overall power bias for the entire span was also considered, but was a secondary issue.

For comparison purposes, a standard linear MCP method with unconstrained best fit was also used to estimate wind speeds using data from the nearest Reanalysis point. These wind speeds were then applied to the power curve to estimate power.

The enhanced MCP method of the present invention used data from six Reanalysis points, such as sites 204a–204f, surrounding the tower site, such as site 202. The relative positions of sites 204a–204f and site 202 as depicted in FIG. 2 are for illustration only and are not representative of the actual positions of the points of this particular example. At each of the Reanalysis points (204a–204f), multiple variables were included in the correlation, including multiple levels of wind variables and a measure of the thermal lapse rate. As previously mentioned, the number of points used is not critical to the method, and varying numbers of points may be used in other embodiments.

The enhanced MCP method of the present invention was also applied separately to the process of estimating the air density at the tower location and elevation based on conditions at the six Reanalysis points. For training purposes, the on-site density was estimated by adjusting a nearby site's temperature and pressure to the fifty meter AGL (above ground level) altitude at the tower location using the hypsometric relationship between pressures at different heights. In this case, training included air density and temperature values. The density estimates were subsequently used in the long-term process to account for density-based deviations from the power curve.

Various computational learning system components can be used within the method of the present invention to correlate and detect the complex data relationships. Artificial neural nets are an early example of computational learning systems that have shown commercial applicability. Support Vector Machines represent a more recently developed class of computational learning system algorithms with several attractive features when compared with artificial neural nets, including important practical advantages such as more rigorous theoretical underpinnings; strong support for detecting optimal fit patterns between "noisy" input data and the most probable prediction defined on geometrical constructs in N-dimensional hypothesis-space (hyper-planes); optimization that reduces to a "Lagrange multiplier" problem, which leads to well-understood solution techniques; and improved clarity in configuring and training the systems, and therefore in their operational use.

In this particular example, the enhanced MCP method of the present invention employed Support Vector Machine (SVM) regression using data from six surrounding Reanalysis points, with the Reanalysis data being trained to wind speed and the resulting speeds translated to power using a power curve. Note that SVM parameters were optimized to minimize errors in power rather than speed for this particular case, but other strategies could be used in other embodiments. The Reanalysis-based hypothesis variables, or predictor variables, used in the SVM training of this embodiment included wind speed and direction at two levels: a layer average in the lowest thirty millibars of the atmosphere, approximately the lowest 400 meters; and the sigma=0.995 model level, roughly corresponding to thirty meters AGL. Other levels can be used in other embodiments. Several methods were tested for including both speeds and direction in the training, and the best results were obtained by using the direction to break the wind into its X and Y vector components (usually referred to as U and V) and including the components as the hypothesis variables. A measure of the thermal lapse rate was also included as a hypothesis variable.

An example comparison of results of each a conventional linear MCP methodology and the enhanced MCP methodology of the present invention follows.

Traditional Linear MCP

A traditional MCP method using the single nearest long-term Reanalysis location was used as a reference case. Tower wind speeds were matched against each of the Reanalysis wind speed values for the entire tower data period and a linear best fit was established. This linear relationship was then applied to the forty-year time series of Reanalysis data to create a time series of speed and power.

Figure 8:
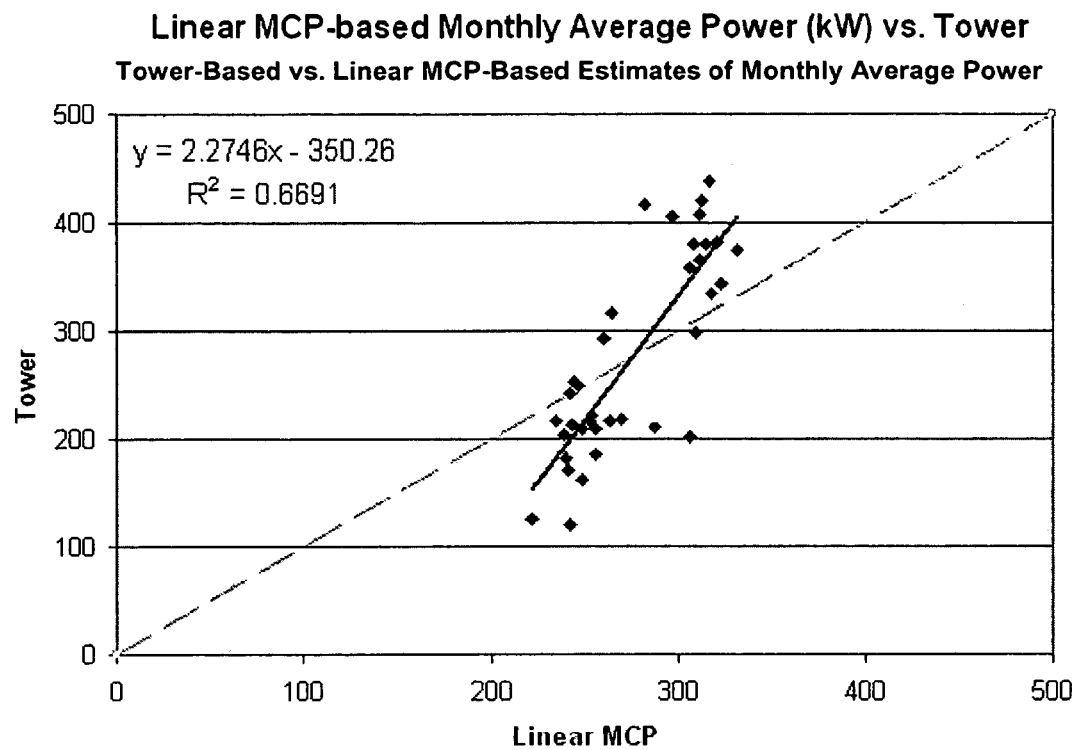
FIG. 8 is a graphic representation of tower-based vs. linear MCP-based estimates of monthly average power.
Figure 9:
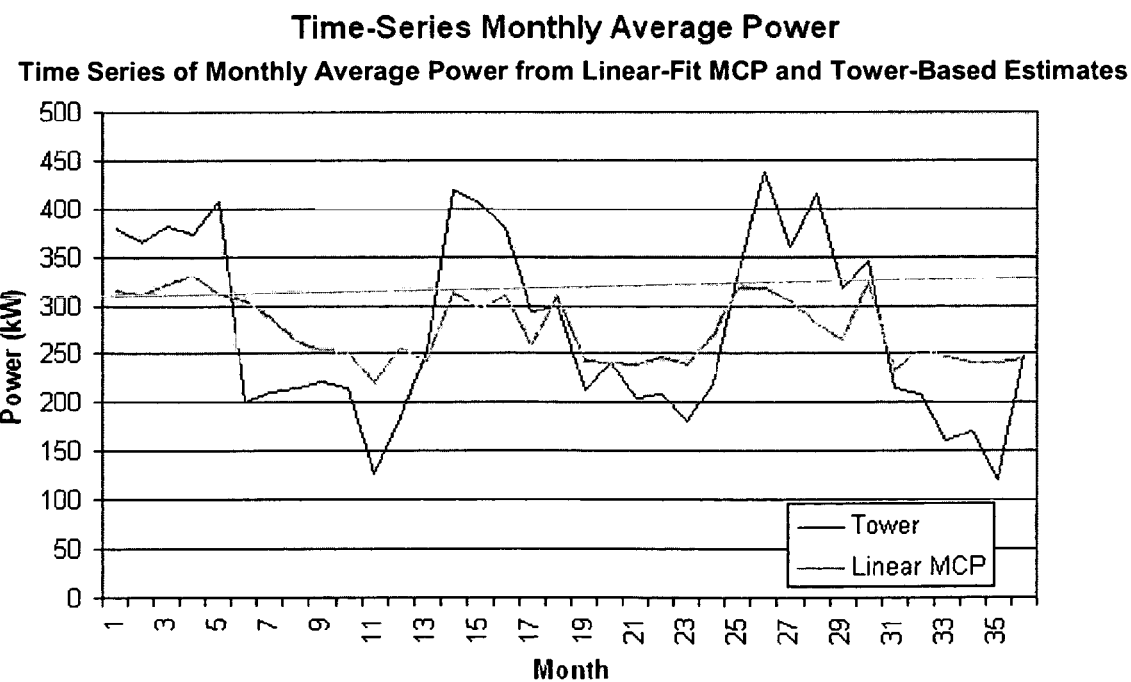
FIG. 9 is a graphic representation of time series of monthly average power from linear-fit MCP and tower-based estimates.

As seen in FIGS. 8 and 9, the pattern of tower-based monthly power is not estimated very well by the traditional method. The average monthly error is 23.9% of actual power, as calculated from the tower data, and the coefficient of determination ($R^2$) is 0.6691. The overall bias, which is the error of the energy estimate for the entire period, is –0.25%. As shown in the time series graph of FIG. 9, however, the dynamic range of the monthly variability is noticeably underestimated.

Enhanced MCP

Wind Speed

To estimate the error of prediction according to the enhanced MCP method of the present invention, a round-robin approach is used in which each month is predicted without using that month's data in training. In other words, each of the thirty-four months referenced above is estimated using the other thirty-three months of training data. This requires a separate training and estimation process for each of the months, plus the final process that uses training data from all months to estimate the long-term time series.

The results achieved according to the present invention are markedly superior to traditional linear MCP results. Average monthly power error was 8.4%, which is about three times smaller than the average monthly error of 23.9% described above. The correlation to tower-generated power values had a coefficient of determination ($R^2$) of 0.9241. Overall bias for the thirty-four-month period was 1.15%. These exemplary results are depicted in FIGS. 10 and 11.

Figure 10:
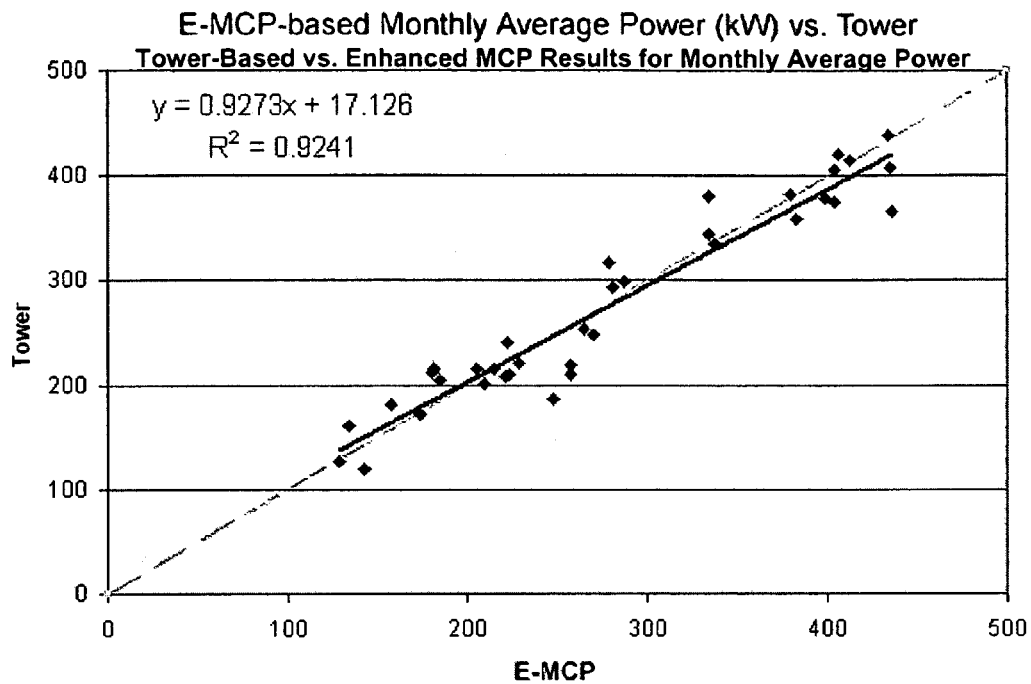
FIG. 10 is a graphic representation of tower-based vs. the method of the present invention's results for monthly average power.
Figure 11:
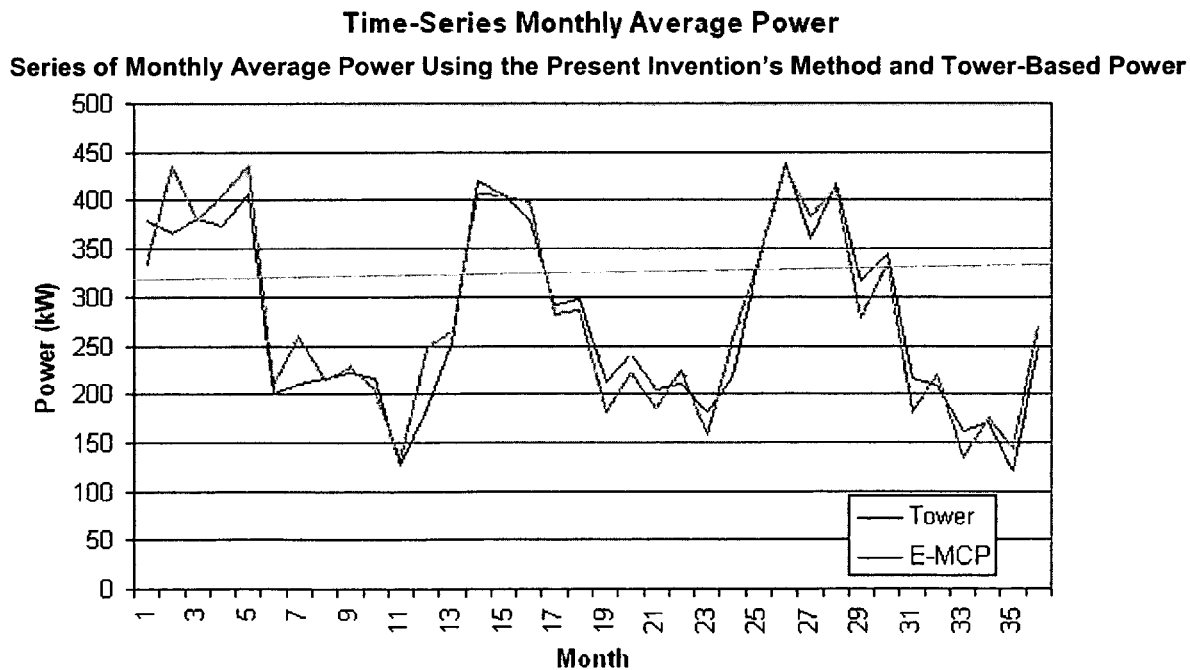
FIG. 11 is a graphic representation of a series of monthly average power using the method of the present invention and tower-based power.

The improvement is very evident when graphically depicted, for example comparing FIG. 8 (linear MCP) with FIG. 10 (enhanced MCP), and FIG. 9 (linear MCP) with FIG. 11 (enhanced MCP), both in the pattern match on the time-series of FIGS. 9 and 11 and the ability to preserve the full range of variability of the power. The excellent fit depicted in FIGS. 10 and 11 provides high confidence that the enhanced MCP method can be applied to the long-term Reanalysis data to give a refined estimation of the normalized power generation for the site of interest.

Air Density

To create an accurate long-term time series of power estimates, an accurate long-term time series of the air density at the site of interest may also be required. Based on a thirty-four-month period of local air density readings, which are airport density readings adjusted to the elevation at the site of interest, the method of the present invention was used to estimate the air density at the tower location using data from six surrounding Reanalysis points. In this case, variables included air density and temperature values from the Reanalysis points.

Figure 12:
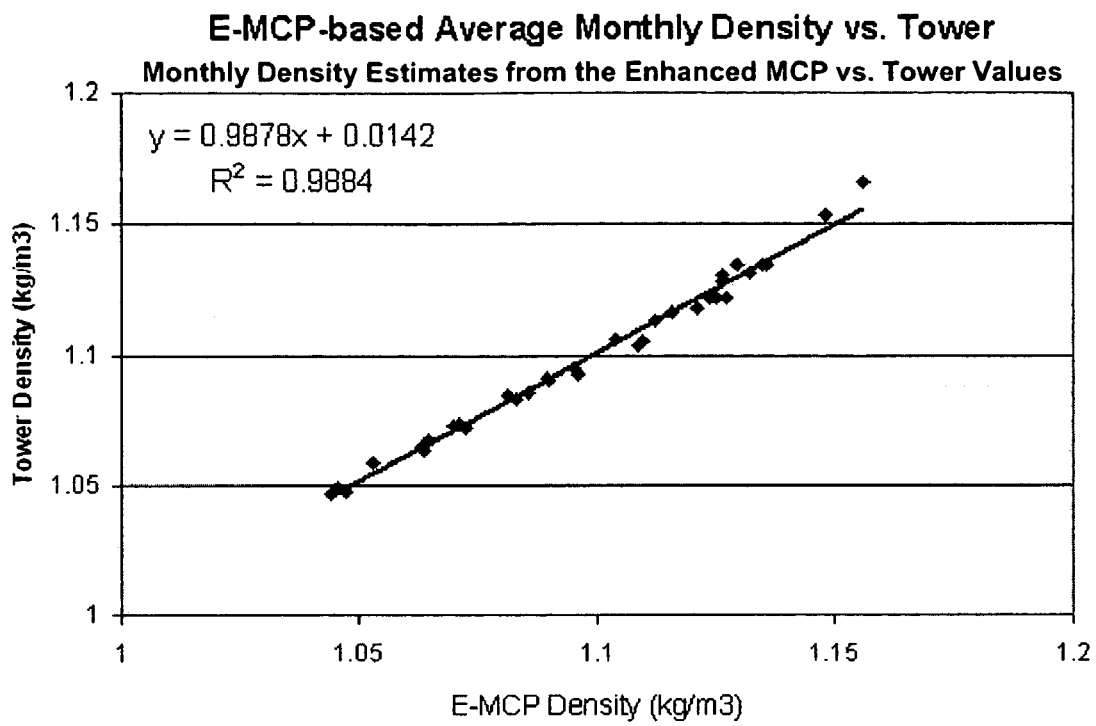
FIG. 12 is a graphic representation of monthly density estimates from the method of the present invention vs. tower values.
Figure 13:
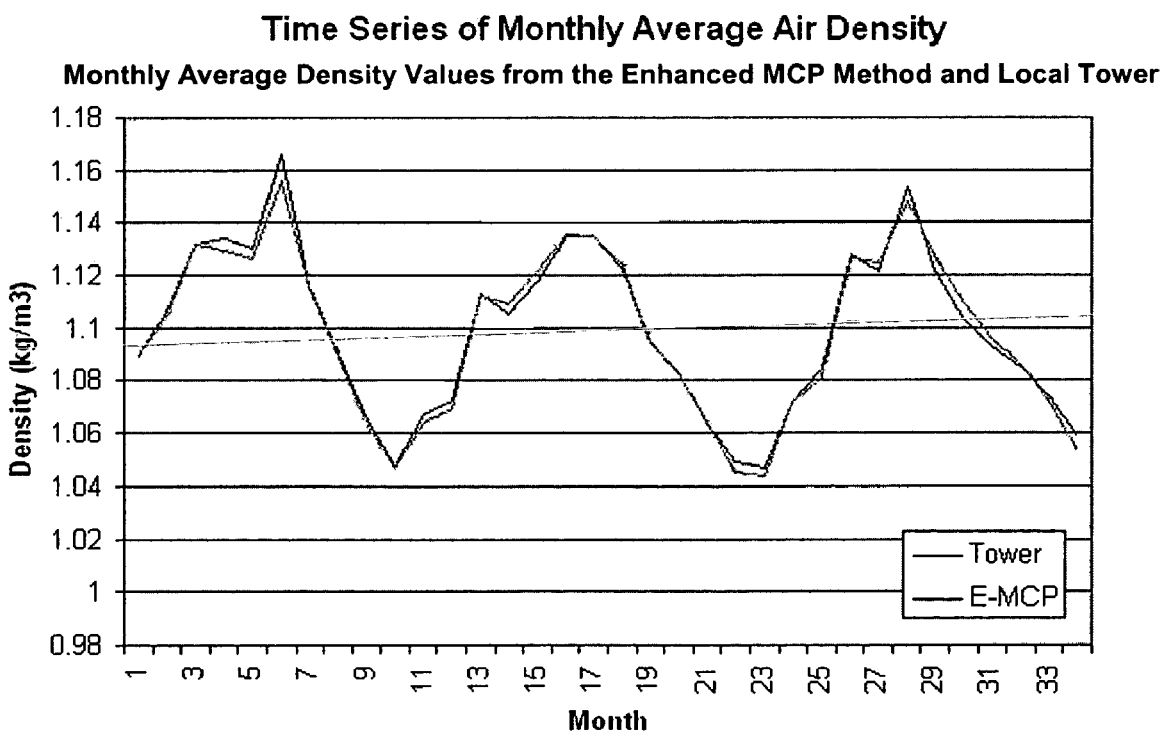
FIG. 13 is a graphic representation of monthly average density values from the method of the present invention and local tower.

As described above for the wind speed analysis, a round-robin approach was used to provide an estimate the error of prediction. As seen in FIGS. 12 and 13, the method of the present invention was able to estimate the on-site air density at the tower with great accuracy. Both the overall bias and the average monthly errors are a small fraction of a percent.

The above-described method is preferably implemented via a computer hardware and processing system (system 310 of FIG. 3), wherein computer-implemented software, firmware, and programming means provide direction as to the functions to be performed during each step of the method and the sequence in which the steps of the method are performed.

Although specific embodiments have been illustrated and described herein for purposes of description of an example embodiment, it will be appreciated by those of ordinary skill in the art that a wide variety of alternate and/or equivalent implementations calculated to achieve the same purposes may be substituted for the specific embodiments shown and described without departing from the scope of the present invention. Those skilled in the art will readily appreciate that the invention may be implemented in a very wide variety of embodiments. This application is intended to cover any adaptations or variations of the various embodiments discussed herein, including the disclosure information in the attached appendices. Therefore, it is manifestly intended that this invention be limited only by the claims and the equivalents thereof.

The invention claimed is:

1. A computer-implemented method for correlating and predicting wind speed at a test wind farm location, the method comprising the steps of:
   assembling a first set of meteorological measurements at a test wind farm location over a short-term time period;
   assembling a second set of meteorological measurements at a plurality of geographic locations other than the test wind farm location over a long-term time period;
   recording the first and second sets of meteorological measurements on a computer-readable medium;
   correlating the first and second sets of meteorological measurements during at least a portion of the short-term time period using at least one computer-implemented non-linear mathematical method to determine a non-linear pattern of relationships between time-based subsets of each the first and second sets of meteorological measurements that accurately predicts each time-based subset of the first set of meteorological measurements from only a corresponding time-based subset of the second set of meteorological measurements;
   predicting a set of meteorological conditions at the test wind farm location for at least a portion of the long-term time period not including the short-term time period using the second set of meteorological measurements and the determined non-linear pattern of relationships, the set of meteorological conditions comprising a wind speed; and
   determining a suitability of the test wind farm location based at least in part on the step of predicting, and providing a visual representation thereof.

2. The method of claim 1, wherein the step of correlating the first and second sets of meteorological measurements further comprises using at least one computer-implemented non-linear mathematical method according to a computational learning system to determine a non-linear pattern of relationships between subsets of each the first and second sets of meteorological measurements, wherein the computational learning system is selected from the group consisting of an artificial neural network and a support vector machine.

3. The method of claim 1, wherein the step of assembling a second set of meteorological measurements further comprises:
   selecting each of the plurality of geographic locations based on at least one characteristic of each geographic location, the characteristic selected from the group consisting of: a geographic location local to the test wind farm location; a geophysical characteristic similar to a geophysical characteristic of the test wind farm location; a meteorological characteristic similar to a meteorological characteristic of the test wind farm location; and a public availability of the second set of meteorological measurements over the long-term time period at the geographic location, and
   assembling publicly available wind speed measurements at each of the plurality of geographic locations, and
   wherein the step of assembling the first set of meteorological measurements further comprises assembling wind speed measurements at the test wind farm location.

4. The method of claim 3, further comprising the steps of:
   converting the first and second sets of wind speed measurements to first and second sets of wind power values; and
   performing the steps of correlating and predicting based on the first and second sets of power values to predict a set of wind power conditions at the test wind farm location for at least a portion of the long-term time period not including the short-term time period.

5. The method of claim 1, further comprising the step of:
   aggregating the first and second sets of meteorological measurements by time-averaging the first and second sets.

6. The method of claim 5, further comprising the step of:
   varying a time-averaging unit for at least one of the first set and the second set to find an improved correlation.

7. The method of claim 1, further comprising the step of:
   extrapolating at least one of the first and second sets of meteorological measurements to a desired height above ground level.

8. The method of claim 1, further comprising the step of:
   extrapolating at least one of the first and second sets of meteorological measurements from a measurement location to a desired location.

9. The method of claim 1, further comprising the step of:
   defining a three-dimensional geographic and atmospheric region comprising the plurality of geographic locations and the test wind farm location.

10. The method of claim 9, wherein the step of assembling a first set of meteorological measurements further comprises extracting the meteorological measurements for each of the plurality of geographic locations from a publicly available multi-year retroactive record of global atmospheric data comprising data related to the region.

11. The method of claim 1, further comprising the step of:
    graphically presenting the predicted set of meteorological conditions for the test wind farm location.

12. The method of claim 1, wherein the step of assembling a first set of meteorological measurements further comprises assembling a first set of meteorological measurements at a test wind farm location over a time period of from about one year to about five years, and wherein the step of assembling a second set of meteorological measurements further comprises assembling a second set of meteorological measurements at a plurality of geographic locations over a time period of from about two years to about one hundred years that includes the time period of from about one year to about five years.

13. The method of claim 1, wherein the step of correlating further comprises:
    correlating the first and second sets of meteorological measurements during at least a portion of the short-term time period using at least one computer-implemented non-linear mathematical method to determine a non-linear pattern of relationships between monthly subsets of each the first and second sets of meteorological measurements that predicts each monthly subset of the first set of meteorological measurements from only a corresponding time-based subset of the second set of meteorological measurements with a monthly average error of less than about ten percent.

14. The method of claim 1, wherein the step of correlating further comprises:
correlating the first and second sets of meteorological measurements during at least a portion of the short-term time period using at least one computer-implemented non-linear mathematical method to determine a non-linear pattern of relationships between time-based subsets of each the first and second sets of meteorological measurements that predicts each time-based subset of the first set of meteorological measurements from only a corresponding time-based subset of the second set of meteorological measurements with a coefficient of correlation at least about 0.80.

15. A computer-implemented meteorological measure-correlate-predict method comprising the steps of:
assembling a computer-readable set of publicly available hypothesis variables related to at least one meteorological condition observed at each of a plurality of geographic locations over a multi-year time period;
assembling at least one known target variable related to at least one meteorological condition observed at a target location that is different than the plurality of geographic locations over a time period shorter than the multi-year time period;
correlating the computer-readable set of hypothesis variables and the known target variable during at least a portion of the time period shorter than the multi-year time period by using a computer-implemented non-linear mathematical method to determine at least one pattern of relationships between time-based subsets of each of the hypothesis variables and the known target variable, the pattern of relationships defining a non-linear formula to accurately predict each time-based subset of the known target variable from only a corresponding time-based subset of the hypothesis variables;
predicting at least one unknown target variable related to at least one meteorological condition at the target location for at least a portion of the multi-year time period not including the time period shorter than the multi-year time period using the at least one known hypothesis variable and the non-linear formula; and
determining a suitability of the target location as a wind turbine location based at least in part on the step of predicting, and providing a visual representation thereof.

16. The method of claim 15, wherein the step of correlating the computer-readable set of hypothesis variables and the known target variable during at least a portion of the time period shorter than the multi-year time period by using a computer-implemented non-linear mathematical method further comprises using a non-linear mathematical method according to a computational learning system, wherein the computational learning system is selected from the group consisting of an artificial neural network and a support vector machine.

17. The method of claim 15, wherein the step of assembling a computer-readable set of publicly available hypothesis variables further comprises selecting each of the plurality of locations based on at least one characteristic of each location, the characteristic selected from the group consisting of a geographic location local to the target location, a geophysical characteristic similar to a geophysical characteristic of the target location, a meteorological characteristic similar to a meteorological characteristic of the target location, and the public availability of the computer-readable set of hypothesis variables over the multi-year time period.

18. The method of claim 15, further comprising the steps of:
aggregating the computer-readable set of publicly available hypothesis variables into a time-averaged period; and
aggregating the at least one known target variable into a time-averaged period.

19. The method of claim 15, further comprising the step of:
varying a time-averaging unit for at least one of the computer-readable set of publicly available hypothesis variables and the at least one known target variable to find an improved correlation.

20. The method of claim 15, further comprising the step of:
extrapolating at least one of the computer-readable set of publicly available hypothesis variables and the at least one known target variable to a desired height above ground level.

21. The method of claim 15, further comprising the step of:
extrapolating at least one of the computer-readable set of publicly available hypothesis variables and the at least one known target variable from a location of observance to a desired location.

22. The method of claim 15, wherein the step of assembling a computer-readable set of publicly available hypothesis variables related to at least one observed meteorological condition further comprises extracting the hypothesis variables for a selected region of the globe that includes the target location from a publicly available retroactive record of global atmospheric data.

23. The method of claim 15, further comprising the step of:
graphically presenting the predicted target variable for the target location.

24. The method of claim 15, wherein the step of assembling a computer-readable set of publicly available hypothesis variables further comprises assembling a computer-readable set of publicly available hypothesis variables related to at least one meteorological condition observed at each of a plurality of locations over a multi-year time period of from about two years to about one hundred years, and wherein the step of assembling at least one known target variable further comprises assembling at least one known target variable related to at least one meteorological condition observed at a target location over a time period of from about one year to about five years that overlaps the multi-year time period.

25. The method of claim 15, wherein the step of correlating further comprises:
correlating the computer-readable set of hypothesis variables and the known target variable during at least a portion of the time period shorter than the multi-year time period by using a computer-implemented non-linear mathematical method to determine at least one pattern of relationships between monthly subsets of each of the hypothesis variables and the known target variable, the pattern of relationships defining a non-linear formula to predict each monthly subset of the known target variable from only a corresponding time-based subset of the hypothesis variables with a monthly average error of less than about ten percent.

26. The method of claim 15, wherein the step of correlating further comprises:

correlating the computer-readable set of hypothesis variables and the known target variable during at least a portion of the time period shorter than the multi-year time period by using a computer-implemented nonlinear mathematical method to determine at least one pattern of relationships between lime-based subsets of each of the hypothesis variables and the known target variable, the pattern of relationships defining a non-linear formula to predict each time-based subset of the known target variable from only a corresponding time-based subset of the hypothesis variables with a coefficient of correlation of at least about 0.80.

27. A wind speed measure-correlate-predict system comprising:

computer-implemented means for assembling a first computer-readable set of meteorological measurements at a test geographic location over a short-term time period;

computer-implemented means for assembling a second computer-readable set of meteorological measurements at a plurality of geographic locations other than the test geographic location over a long-term time period;

computer-implemented means for correlating the first and second computer-readable sets of meteorological measurements during at least a portion of the short-term time period using at least one computer-implemented non-linear mathematical method to determine a non-linear pattern of relationships between subsets of each the first and second computer-readable sets of meteorological measurements that accurately predicts each time-based subset of the first computer-readable set of meteorological measurements from only a corresponding time-based subset of the second computer-readable set of meteorological measurements; and computer-implemented means for predicting a computer-readable set of meteorological conditions at the test geographic location for at least a portion of the long-term time period not including the short-term time period using the second set of meteorological measurements and the detected pattern of relationships, the computer-readable set of meteorological conditions comprising a wind speed used to determine and visually present a suitability of the test geographic location for a wind turbine.

28. The system of claim 27, wherein the computer-implemented means for assembling a second computer-readable set of meteorological measurements further comprises:

means far selecting each of the plurality of geographic locations based on at least one characteristic of each geographic location, the characteristic selected from the group consisting of: a geographic location local to the test geographic location; a geophysical characteristic similar to a geophysical characteristic of the test geographic location; a meteorological characteristic similar to a meteorological characteristic of the test geographic location; and the public availability of the second computer-readable set of meteorological measurements over the long-term time period at the geographic location, and means for assembling publicly available wind speed measurements at each of the plurality of geographic locations; and wherein the computer-implemented means for assembling the first computer-readable set of meteorological measurements further comprises means for assembling wind speed measurements at the test geographic location.

29. The system of claim 28, further comprising:

computer-implemented means for converting the first and second computer-readable sets of wind speed measurements to first and second computer-readable sets of wind power values; and computer-implemented means for performing the steps of correlating and predicting based on the first and second computer-readable sets of power values to predict a set of wind power conditions at the test geographic location for at least a portion of the long-term time period not including the short-term time period.

30. The system of claim 27, further comprising;

computer-implemented means for aggregating the first and second computer-readable sets of meteorological measurements by time-averaging the first and second sets.

31. The system of claim 30, further comprising:

computer-implemented means for varying a time-averaging unit for at least one of the first set and the second set to find an improved correlation.

32. The system of claim 27, further comprising:

computer-implemented means for extrapolating at least one of the first and second computer-readable sets of meteorological measurements to a desired height above ground level.

33. The system of claim 27, further comprising:

computer-implemented means for extrapolating at least one of the first and second computer-readable sets of meteorological measurements from a measurement location to a desired location.

34. The system of claim 27, further comprising:

computer-implemented means for defining a tree-dimensional geographic and atmospheric region comprising the plurality of geographic locations and the test geographic location.

35. The system of claim 34, wherein the computer-implemented means for assembling a first computer-readable set of meteorological measurements further comprises means for extracting the meteorological measurements for each of the plurality of geographic locations from a publicly available multi-year retroactive record of global atmospheric data comprising data related to the region.

36. The system of claim 27, further comprising:

means for graphically presenting the predicted set of meteorological conditions for the test geographic location.

37. The system of claim 27, wherein the computer-implemented means for assembling a first computer-readable set of meteorological measurements further a test geographic location over a time period of from about one year to about five years, and wherein the computer-implemented means for assembling a second computer-readable set of meteorological measurements further comprises means for assembling a second computer-readable set of meteorological measurements at a plurality of geographic locations over a time period of from about two years to about one hundred years that includes the time period of from about one year to about five years.

38. The system of claim 27, wherein the computer-implemented means for correlating the first and second computer-readable sets further comprises server-implemented computational learning system means for applying at least one non-linear mathematical method to determine a non-linear pattern of relationships between subsets of each the first and second computer-readable sets of meteorological measurements that accurately predicts each time-based subset of the first computer-readable set of meteorological measurements from only a corresponding time-based subset of the second computer-readable set of meteorological measurements, wherein the server-implemented computational learning system means is selected from the group consisting of an artificial neural network means and a support vector machine means.

39. The system of claim 27, wherein the computer-implemented means for correlating further comprises means for correlating the first and second computer-readable sets of meteorological measurements during at least a portion of the short-term time period using at least one computer-implemented non-linear mathematical method to determine a non-linear pattern of relationships between monthly subsets of each the first and second computer-readable sets of meteorological measurements that predicts each monthly subset of the first computer-readable set of meteorological measurements from only a corresponding time-based subset of the second computer-readable set of meteorological measurements with a monthly average error of less than about ten percent.

40. The system of claim 27, wherein the computer-implemented means for correlating further comprises means for correlating the first and second computer-readable sets of meteorological measurements during at least a portion of the short-term time period using at least one computer-implemented non-linear mathematical method to determine a non-linear pattern of relationships between time-based subsets of each the first and second computer-readable sets of meteorological measurements that predicts each time-based subset of the first computer-readable set of meteorological measurements from only a corresponding time-based subset of the second computer-readable set of meteorological measurements with a coefficient of correlation at least about 0.80.

41. A computer-implemented wind farm location suitability determination system comprising:
   a first computer-readable set of meteorological measurements associated with a test geographic location over a short-term time period;
   a second computer-readable set of meteorological measurements associated with a plurality of geographic locations other than the test geographic location over a long-term time period;
   a computer-implemented correlator comprising at least one non-linear mathematical method adapted to correlate the first and second computer-readable sets of meteorological measurements during at least a portion of the short-term time period to determine a non-linear pattern of relationships between subsets of each the fast and second computer-readable sets of meteorological measurements that accurately predicts each time-based subset of the first computer-readable set of meteorological measurements from only a corresponding time-based subset of the second computer-readable set of meteorological measurements; and
   a computer-implemented predictor adapted to predict a computer-readable set of meteorological conditions at the test geographic location for at least a portion of the long-term time period not including the short-term time period using the second set of meteorological measurements and the determined non-linear pattern of relationships and to determine and visually present a suitability of the test geographic location for a wind farm location based at least in part on the computer-readable set of meteorological conditions.

42. The system of claim 41, further comprising:
   a graphical presentation of the computer-readable set of meteorological conditions for the test geographic location.

* * * * *